Dec. 23, 1969    H. BAYER    3,486,112
SYSTEM FOR GIVING CALIBRATED AMPLITUDE INDICATIONS
Filed Dec. 26, 1967    2 Sheets-Sheet 1
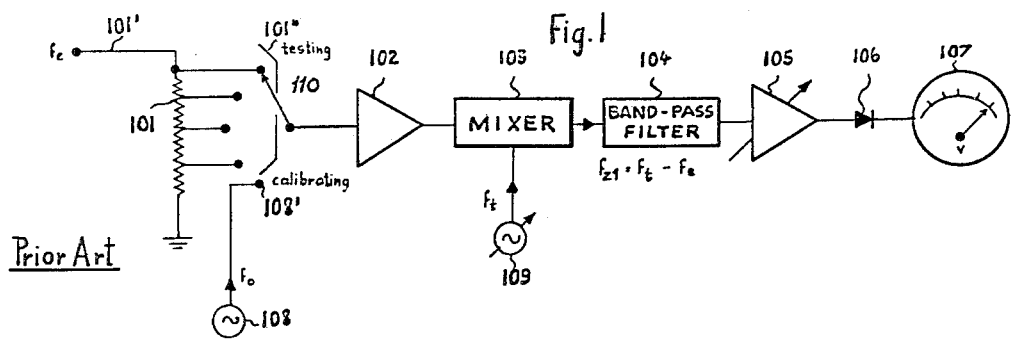
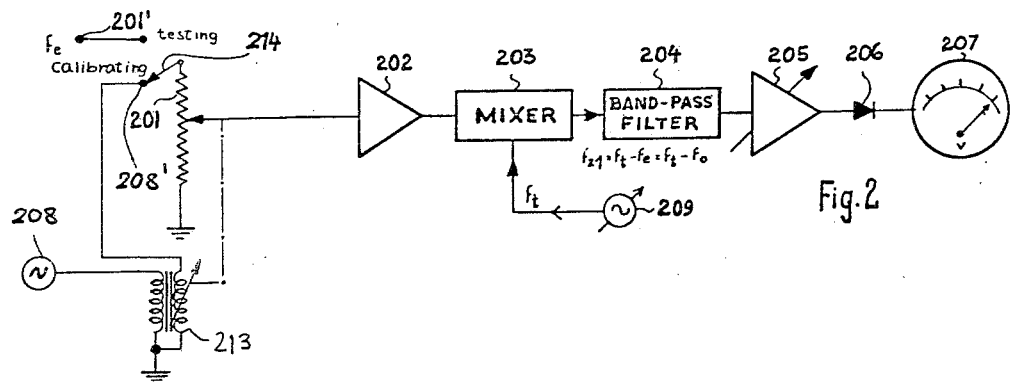
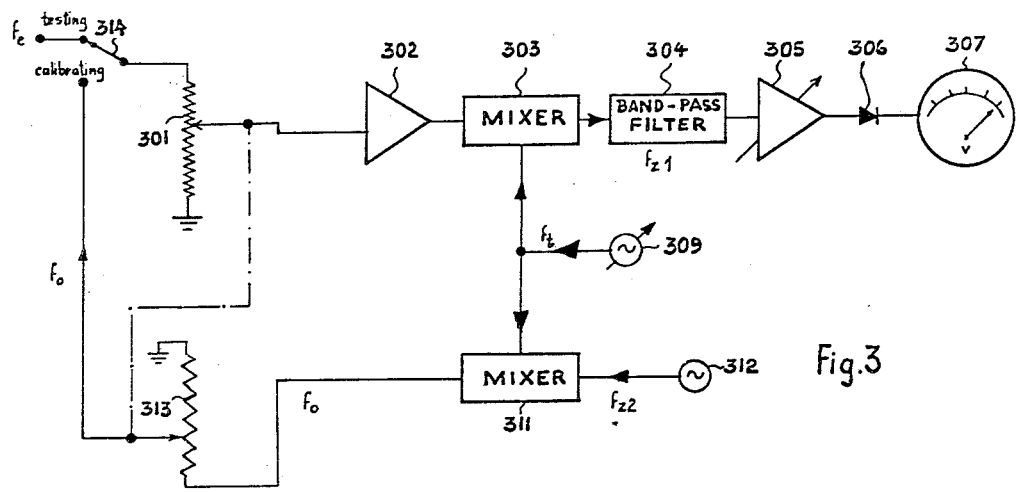
INVENTOR.
Herbert Bayer
BY
Karl G. Ross
Attorney

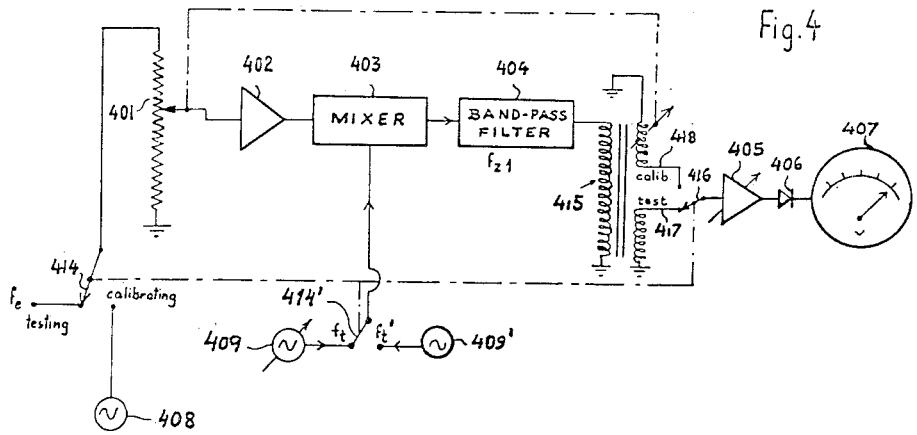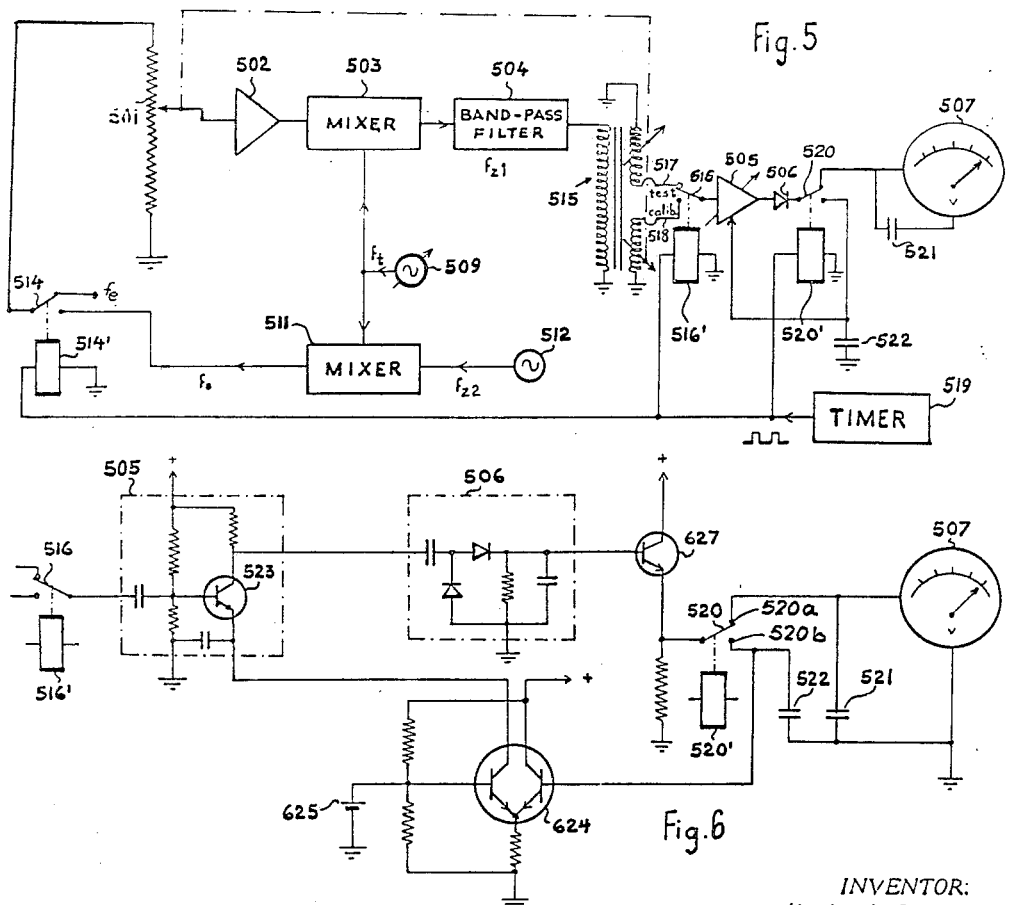

3,486,112
SYSTEM FOR GIVING CALIBRATED
AMPLITUDE INDICATIONS
Herbert Bayer, Reutlingen, Germany, assignor to Wandel
u. Goltermann KG., Muhleweg, Germany, a corporation of Germany
Continuation-in-part of application Ser. No. 553,731,
May 31, 1966. This application Dec. 26, 1967, Ser.
No. 693,431
Claims priority, application Germany, Dec. 23, 1966,
W 43,076
Int. Cl. G01r 1/02, 35/04
U.S. Cl. 324—130                                       5 Claims

ABSTRACT OF THE DISCLOSURE

Circuit arrangement for measuring amplitudes of different input frequencies which are heterodyned with the output of a local oscillator whose operating frequency is adjustable to produce a beat oscillation passed by a narrow filter, the system including means for calibrating the transmission circuits with the aid of a locally generated reference wave of predetermined amplitude; a voltage divider in the input is ganged with a compensating adjustable impedance, such as a potentiometer or a stepdown transformer, connected in cascade with the reference-wave generator to maintain a substantially constant voltage level of the beat oscillation, independent of the position of the voltage divider in the input, during calibration.

---

This application is a continuation-in-part of my copending application Ser. No. 553,731 filed May 31, 1966, entitled, System for Giving Calibrated Amplitude Indications.

My present invention relates to a system for indicating the amplitudes of different alternating signal voltages and, more particularly, to a circuit arrangement for calibrating such system by substituting, at regular or irregular intervals, a reference wave of predetermined amplitude for the applied signal voltages.

In a system of this type it is customary to mix the applied signal voltage with a control frequency so selected that a resulting beat oscillation of invariable frequency $f_{z1}$ is transmitted to an indicating instrument, such as a voltmeter preceded by a rectifier, whereby the influence of frequency changes upon the indicator proper is eliminated. Thus, for example, the control frequency $f_t$ may be so chosen that $f_{z1}=f_t-f_e$ where $f_e$ is the frequency of the applied signal. If, now, the signal frequency $f_e$ is replaced by a reference wave of frequency $f_o$, the variable oscillator producing the control frequency $f_t$ must be readjusted to a frequency $f_{to}$ satisfies the relationship $f_{to}-f_o=f_{z1}$. Thereupon, the amplitude of the beat oscillation is measured in what will hereinafter be referred to as a "calibrating position" (although this term is not meant to connote conformation to some fixed standard) and the level of the indicator is adjusted, if necessary, to compensate for any changes in the transmission characteristics of the system that may have occurred since the last previous calibration. Finally, the system is switched back to its "test position" in which the control-frequency oscillator must be readjusted to produce the desired frequency $f_t$ corresponding to the applied signal.

Frequently, a system of the general type referred to includes in its input a voltage divider or other adjustable step-down device whose output can be varied by definite increments for the purpose of reducing the applied signal voltage, is necessary, to a magnitude within a predetermined amplitude range.

The general object of this invention is to provide an improved circuit arrangement of the character described in which the aforementioned step-down device may be included in the calibration circuit and need not be readjusted during the calibrating operation.

A more particular object of my invention is to provide means in such circuit arrangement whereby the need for adjustment and readjustment of the control-frequency oscillator before and after calibration is eliminated.

In accordance with my present invention I provide, in combination with an adjustable step-down device for the signal voltages applied to the input of the system, adjustable impedance means ganged with this device in a relatively inverted sense so that, upon connection thereof in the transmission path when the system is in its calibrating position, the voltage level of the beat oscillation remains substantially constant in any position of the device.

In general, the compensating impedance means according to this invention may be either resistive or reactive, an ohmic impedance network being preferred for this purpose if the branch of the system containing that impedance carries voltages of widely varying frequencies; this would be true where, as shown in my copending application referred to, the reference wave of frequency $f_o$ is synthesized from the output $f_t$ of the variable control-frequency oscillator and a fixed base frequency $f_{z2}$ equal to the beat frequency $f_{z1}$, these two constituent frequencies being combined in a further mixer with a variable output frequency $f_o = f_t - f_{z2}$ transmitted through the compensating impedance to the input of the system in lieu of the signal frequencies normally applied thereto. If, however, the compensating impedance is to be traversed by a single frequency only, as when that impedance is connected in the output of the band-pass filter associated with the mixer generating the beat frequency $f_{z1}$, the need for constancy of attenuation over an extended frequency range disappears; under these conditions, therefore, the compensating impedance may be partly or completely reactive and, advantageously, is represented by an adjustable step-down transformer.

According to a further feature of this invention, the reference wave of frequency $f_o$ is derived from a fixed local oscillator and is supplied to the mixer ahead of the band-pass filter together with a complementary frequency $f_t$, so related to $f_o$, e.g., by the expression $f_{z1}=f_{t'}-f_o$, that the output of the mixer will be the beat frequency $f_{z1}$ passed by the filter.

Thus, for the purpose of calibration, it is merely necessary to connect the output $f_o$ of the first-mentioned fixed oscillator to the input of the system in lieu of the normally applied signal voltages $f_e$ and, concurrently, to substitute the second fixed oscillator for the variable oscillator normally connected to the mixer. In this case, for the reasons noted above, the compensating impedance may be a transformer or other reactance even when connected in the input circuit of the system.

In accordance with a further feature of my invention, the test/calibration switch is automatically and periodically reversed under the control of a timer, advantageously with alternations of relatively long test intervals and relatively short calibrating intervals. To obviate the need for manual readjustment, the level control of the indicator may be designed as a capacitively biased amplifier whose input capacitor is charged during calibration by the rectifier output of the beat-frequency filter; during the ensuing test interval, this bias remains substantially constant. If the indicator proper is disconnected from the filter by contacts of the timer-operated switch during calibration, continuity of indication may be insured by the provision of a storage condenser in the indicator input to maintain the previously applied signal potential throughout the calibration interval.

The above and other features of my present invention will become apparent in greater detail from the following description given in conjunction with the accompanying drawing in which:

FIG. 1 is a circuit diagram of a conventional system designed to provide calibrated indications of signal amplitudes;

FIG. 2 is a circuit diagram similar to FIG. 1, illustrating my present improvement;

FIG. 3 is another circuit diagram representing a modification of the improved system of FIG. 2;

FIG. 4 is a further circuit diagram illustrating still another embodiment;

FIG. 5 is a circuit diagram of an embodiment with automatic switchover; and

FIG. 6 is a fragmentary circuit diagram showing details of the system of FIG. 5.

Analogous elements in the several figures are designated by similar reference numerals which differ only in their hundreds digit.

The conventional system shown in FIG. 1 comprises a voltage divider 101 having an input terminal 101' connected to a source of signal voltages $f_e$ and a set of output terminals 101'' selectively engageable by a switch armature 110. In an alternate position, this armature engages a contact 108' connected to the output of a fixed-frequency oscillator 108 which generates a reference wave of frequency $f_o$.

Switch 110 works into an amplifier 102 whose output is delivered to a mixer 103 along with a frequency $f_t$ produced by a variable oscillator 109. Mixer 103 derives therefrom a beat frequency $f_{z1}=f_t-f_e$ which, after clearing a band-pass filter 104 centered thereon, is fed to an adjustable amplifier 105 whose output is rectified in a network 106 and applies an input potential to a voltage indicator 107.

In the operation of the system of FIG. 1, the following five steps must be performed from time to time for proper calibration:

(a) Moving switch 110 into "calibrating" position on contact 108';

(b) Adjusting the oscillator 109 to an output frequency $f_{t0}=f_{z1}+f_o$;

(c) Reading the instrument 107 and, if necessary, adjusting the amplifier 105 to establish a predetermined signal level in the output of rectifier 106;

(d) Restoring switch 110 to the selected contact 101'';

(e) Returning oscillator 109 to provide a control frequency $f_t$ which bears the relationship $f_t=f_e+f_{z1}$ to the applied signal voltage $f_e$.

In accordance with the improvement illustrated in FIG. 2, in which the incremental voltage divider 101 has been replaced by a continuously adjustable potentiometer 201, I have interposed a variable reactance in the form of a step-down transformer 213 between the local oscillator 208, which supplies the reference frequency $f_o$, and a calibrating contact 208' of a switch 214 serving for the changeover between testing and calibrating. The control element of transformer 213, which may be of any conventional design, is ganged with the slider of potentiometer 201 so that their combined attenuation of reference wave $f_o$, in the calibrating position illustrated, is constant for any setting of potentiometer 201. Since transformer 213, when in use, passes only the frequency $f_o$, no allowance need be made for any frequency dependence of its step-down ratio.

The system of FIG. 3 differs from that of FIGS. 1 and 2 by the replacement of fixed-frequency oscillation generator 108 or 208 with an oscillator 312 which produces a fixed-base frequency $f_{z2}=f_{z1}$, this oscillator working into a mixer 311 which also received the output $f_t$ of generator 309 to derive therefrom the reference frequency $f_o=f_t-f_{z2}$. Mixer 303 then reconstitutes the feat frequency $f_{z1}$ which is passed by the filter 304 and is independent of the setting control-frequency oscillator 309, being equal to the operating frequency $f_{z2}$ of source 312. Thus, steps (b) (d) are omitted in the calibration of the system of FIG. 3. Moreover, since the reference frequency $f_o$ equals the signal frequency $f_z$ for which the oscillator 309 has been preset, the same frequency passes through circuits 302 and 303 during calibration and testing so that the frequency characteristics of these circuits no longer affect the result.

In the system illustrated in FIG. 3, element 301 may be a high-ohmic resistance while element 313 represents only a low-ohmic broad-band termination of mixer 311, thereby reducing losses and frequency-dependent attenuation changes in circuit 311.

FIG. 4 shows the replacement of variable impedance 313 by a step-down transformer 415 connected in the output of band filter 404. Transformer 415 has a first output lead 417, of fixed step-down ratio, and a second output lead 418 whose step-down ratio is variable complementarily to the attenuation of potentiometer 401 ganged therewith. A switch arm 416, ganged with arm 414, connects the input of amplifier 405 to lead 417 in test position and to lead 418 in calibrating position.

Furthermore, the synthesizing circuit 311, 312 of FIG. 3 has been replaced by two local fixed-frequency oscillators, i.e., a source 408 of reference frequency $f_o$, similar to oscilators 108 and 208, and an oscillator 409' generating a complementary frequency $f_{t'}=f_{z1}-f_o$, in addition to variable oscillator 409 which reduces the control frequency $f_t$, the outputs of oscillators 409 and 409' being alternately connectable to mixer 403 through switchover contacts 414' ganged with contacts 414 and 416.

In the system of FIG. 5, generally similar to that of FIG. 4, the ganged switch arms 514, 516 are shown controlled by a timer 519 which also concurrently operates a further armature 520 associated with the input circuit 505, 506 of indicator 507. As shown more clearly in FIG. 6, where the same reference numerals are used as in FIG. 5, armature 520 alternately engages a pair of contacts 520a (testing) and 520b (calibrating) respectively connected to two grounded capacitors 521, 522. Condenser 521 maintains a substantially constant input potential for indicator 507 during calibration when the output of rectifier 506, amplifier by a D-C amplifier 627, is disconnected from this indicator. Amplifier 505 is shown to comprise a transistor 523 having its emitter biased by a differential amplifier 624, one input of the latter having applied thereto a fixed biasing voltage from a battery 625 whereas its other input is connected to condenser 522 so that its gain, and therefore that of transistor 623, depends on the charging potential of this condenser. Signal amplification during testing is therefore determined by the charging voltage developed during the preceding calibration period. The switchover from testing to calibration may occur at, say, one-second intervals, with calibrating lasting for 50 msec. Contacts 514, 516 and 520 are the armature of relays having timer-energized windings 514', 516' and 520'.

It will be apparent that the feedback circuit of beat-frequency amplifier 505, including the capacitor 522 and the differential amplifier 624, compensates for changes in circuit parameters in substantially the same manner as would an operator supervising the system of FIGS. 2, 3 or 4, i.e., by varying the gain of the beat-frequency amplifier until its output voltage has been restored to, approximately, a predetermined magnitude; naturally, slight variations in capacitor potential will be necessary in order to make the gain control operative.

Although the output lead 417 of FIG. 4 has been shown fixedly connected to an invariable secondary winding of transformer 415, its voltage could also be made adjustable (as illustrated for the lead 517 in FIG. 5) inversely with reference to that of lead 418 (or 518), thus in the same sense as that of the input potentiometer 401 (or 501). This reduces the required range of adjustability of that potentiometer. Naturally, the elements 202–502 and 203–503 should have a linear transmission characteristic within the range of reference frequencies $f_0$ applied thereto.

The attenuation-compensating impedances shown in FIGS. 3–5 may be combined, in principle, with any of the various sources of reference frequency illustrated, such as the conventional frequency generator of FIGS. 1 and 2, the heterodyning network of FIGS. 3 and 5 or the three-oscillator source of FIG. 4. The last-mentioned circuit could also be employed in combination with the adjustable transformer 213 of FIG. 2 without raising problems of frequency-dependent attenuation.

If desired, the one-stage mixer 203–205 may be replaced by a plurality of mixing stages connected in cascade, e.g., for the purpose of lowering the single beat frequency passing through the transformer 415 or 515. Thus, one or more additional mixers each with its own fixed-frequency oscillator, similar to generators 312 and 512, may be inserted between mixers 403, 503 and filters 404, 504.

I claim:
1. A circuit arrangement for giving a calibrated indication of the amplitudes of alternating signal voltages of different frequencies, comprising:
  input means connectable to a source of signal voltage to be measured, said input means including an adjustable step-down device for reducing said applied signal voltage to a magnitude within a predetermined amplitude range;
  variable oscillator means for producing a selected control frequency bearing a predetermined relationship with the frequency of a signal voltage applied to said input means;
  mixer means connected to the outputs of said input means and said oscillator means for deriving from said signal voltage and from said control frequency a fixed-frequency beat oscillation;
  filter means selectively passing the frequency of said beat oscillation;
  amplitude-indicating means connected by way of said filter means to the output of said mixer means for receiving said beat oscillation therefrom, said amplitude-indicating means being provided with level-control means adjustable according to the amplitude of said beat oscillation upon the substitution of a reference wave of predetermined amplitude for said signal voltage;
  generator means for producing said reference wave;
  switch means having a test position and a calibrating position for respectively applying said signal voltage and said reference wave to said mixer means;
  and adjustable impedance means in the output of said filter means, invertedly ganged wtih said step-down device and connectable by said switch means, in said calibrating position thereof, in cascade with said generator means for maintaining a substantially constant voltage level of the beat oscillation passed by said filter means irrespectively of the position of said step-down device.

2. A circuit arrangement as defined in claim 1 wherein said impedance means comprises a step-down transformer.

3. A circuit arrangement for giving a calibrated indication of the amplitudes of alternating signal voltages of different frequencies, comprising:
  input means connectable to a source of signal voltage to be measured, said input means including an adjustable step-down device for reducing said applied signal voltage to a magnitude within a predetermined amplitude range;
  variable oscillator means for producing a selected control frequency bearing a predetermined relationship with the frequency of a signal voltage applied to said input means;
  mixer means connected to the outputs of said input means and said oscillator means for deriving from said signal voltage and from said control frequency a fixed-frequency beat oscillation;
  filter means selectively passing the frequency of said beat oscillation;
  amplitude-indicating means connected by way of said filter means to the output of said mixer means for receiving said beat oscillation therefrom, said amplitude-indicating means being provided with level-control means adjustable according to the amplitude of said beat oscillation upon the substitution of a reference wave of predetermined amplitude for said signal voltage;
  generator means for producing said reference wave;
  switch means having a test position and a calibrating position for respectively applying said signal voltage and sad reference wave to said mixer means, said switch means including a set of timer-controlled contacts periodically shiftable between said test position and said calibrating position;
  and adjustable impedance means invertedly ganged with said step-down device and connectable by said switch means, in said calibrating position thereof, in cascade with said generator means for maintaining a substantally constant voltage level of the beat oscillation passed by said filter means irrespectively of the position of said step-down device;
  said level-control means comprising an amplifier provided with a biasing circuit including a capacitor, said amplitude-indicating means having an input circuit provided with rectifier means connectable by said switch means in said calibrating position to charge said capacitor, thereby varying the gain of said amplifier in response to changes in the amplitude level of said beat oscillation during application of said reference wave to said input means.

4. A circuit arrangement as defined in claim 3 wherein said input circuit further includes condenser means for storing the rectified output of said filter means during application of said reference wave, said switch means disconnecting said filter means from said amplitude-indicating means in said calibrating position.

5. A circuit arrangement for giving a calibrated indication of the amplitudes of alternating signal voltages of different frequencies, comprising:
  input means connectable to a source of signal voltage to be measured, said input means including an adjustable step-down device for reducing said applied signal voltage to a magnitude within a predetermined amplitude range;
  variable oscillator means for producing a selected control frequency bearing a predetermined relationship with frequency of a signal voltage applied to said input means;
  mixer means connected to the outputs of said input means and said oscillator means for deriving from said signal voltage and from said control frequency a fixed-frequency beat oscillation;
  filter means selectively passing the frequency of said beat oscillation;
  amplitude-indicating means connected by way of said filter means to the output of said mixer means for receiving said beat oscillation therefrom, said amplitude-indicating means being provided with level-control means adjustable according to the amplitude of said beat oscillation upon the substitution of a reference wave of predetermined amplitude for said signal voltage;
  a first fixed-frequency oscillator for producing said reference wave;
  switch means having a test position and a calibrating position for respectively applying said signal voltage and said reference wave to said mixer means;
  adjustable impedance means invertedly ganged with said step-down device and connectable by said switch means, in said calibrating position thereof, in cascade with said generator means for maintaining a substantially constant voltage level of the beat oscillation passed by said filter means irrespectively of the position of said step-down device;

a second fixed-frequency oscillator for producing a frequency complementary to that of said reference wave;

and switchover means coupled with said switch means for connecting said second oscillator to said mixer means in lieu of said variable oscillator means in said calibrating position, the combination of said complementary frequency and said reference wave in said mixer means producing said beat oscillation.

References Cited

UNITED STATES PATENTS

| | | | |
|---|---|---|---|
| 2,919,401 | 12/1959 | Cole et al. | 324—130 X |
| 3,181,063 | 4/1965 | Ullrich | 324—130 X |
| 3,332,019 | 7/1967 | Leostic et al. | 325—363 |

FOREIGN PATENTS 946,163  1/1964  Great Britain.

RUDOLPH V. ROLINEC, Primary Examiner

A. E. SMITH, Assistant Examiner

U.S. Cl. X.R.

324—74; 325—363